UNITED STATES PATENT OFFICE.

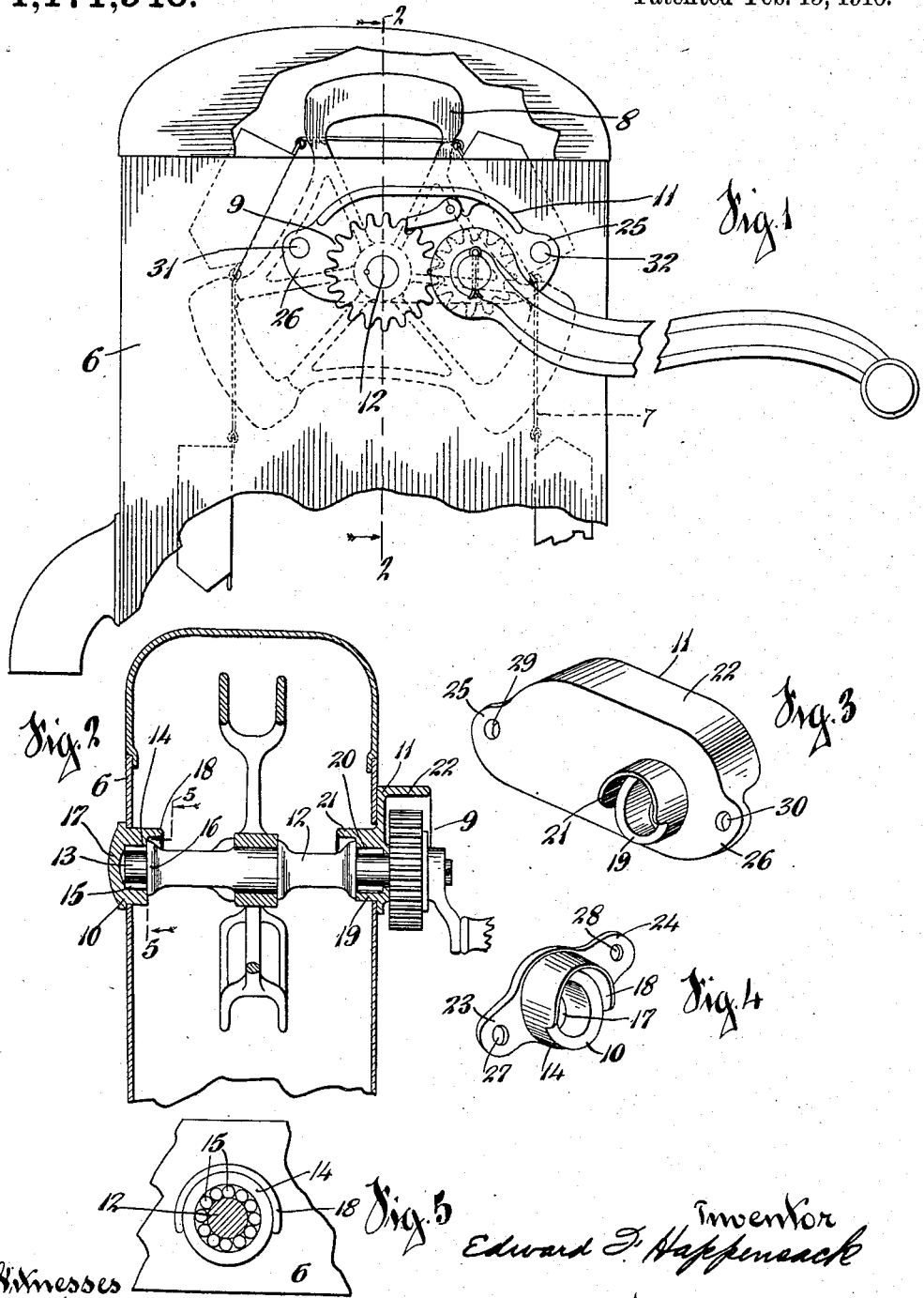

EDWARD F. HAPPENSACK, OF CINCINNATI, OHIO, ASSIGNOR TO THE O. P. SCHRIVER COMPANY, OF CINCINNATI, OHIO, A CORPORATION OF OHIO.

SHAFT-BEARING FOR BUCKET PUMPS.

1,171,946.  Specification of Letters Patent.  Patented Feb. 15, 1916.

Application filed November 14, 1914. Serial No. 872,267.

*To all whom it may concern:*

Be it known that I, EDWARD F. HAPPENSACK, a citizen of the United States of America, and resident of Cincinnati, county of Hamilton, and State of Ohio, have invented certain new and useful Improvements in Shaft-Bearings for Bucket Pumps, of which the following is a specification.

An object of my invention is to produce an improved bearing particularly adapted to use in bucket pumps, in which means are provided for preventing the water lifted by the pump from entering the bearing and washing out the lubricating material contained therein.

A further object is to produce a bearing in which means are provided for preventing the lubricating material from running down the outside of the pump and thereby producing an unsightly appearance.

These and other objects are attained in the apparatus described in the following specification, and illustrated in the accompanying drawings, in which, Figure 1 is a fragmental elevation of a pump having bearings embodying my invention, and showing parts thereof broken away, for convenience of illustration. Fig. 2 is a transverse sectional view taken on the line 2—2 of Fig. 1. Fig. 3 is a perspective view of a bearing embodying certain details of my invention and adapted to be used on the crank side of the pump. Fig. 4 is a perspective view of a bearing embodying certain other details of my invention and adapted to be used on the opposite side of the pump. Fig. 5 is a sectional view taken on the line 5—5 of Fig. 2.

In the illustrated embodiment of my invention, I have shown the usual bucket pump construction comprising a pump casing 6, bucket chain 7, reel 8, for carrying the chain, and mechanism 9, for operating the reel through the agency of the reel mounting shaft 12. Shaft 12 is mounted in bearings 10 and 11, provided on each side of the pump casing.

Bearing 10, which is adapted to mount the free end 13 of the shaft 12, is provided with an inwardly extending journal boss 14. This boss is of an internal diameter such that the end 13 may be mounted on rollers 15, a flange 16 being formed on the shaft 12, for the purpose of preventing displacement of the rollers. The outer end of the bearing is closed by an integrally formed cap 17, which prevents the lubricant contained in the bearing from being discharged to the exterior thereof and from running down the sides of the pump casing. In order to prevent the water from the buckets falling upon and washing out the lubricant contained in the bearings, I have provided an inwardly extending semi-circular flange or shield 18, which projects over the flange 16 and directs the water falling on the shield, away from the bearing. This flange or shield is so formed, that it extends but partially around the boss 14, so as to prevent the formation of a basin, which would catch and retain the water were the shield to be extended entirely around the boss. Substantially the same formation is employed in the construction of the bearing 11, the inwardly extending journal boss 19 thereof also being adapted to mount rollers 20 and being provided with a flange or shield 21, similar to the shield 18, whereby water from the buckets is prevented from entering the bearing. In addition to this the bearing is provided with a flange or shield 22, extending over the operating mechanism 9 of the pump, so that rain and snow are prevented from affecting the operation of the pump. Both of the bearing journal bosses 14 and 19 are passed through openings contained in the sides of the pump casing and are provided with contacting lugs 23, 24, 25 and 26, which are provided with openings 27, 28, 29 and 30, adapted to receive rivets or bolts 31 and 32, for the purpose of securing the bearings in place on the pump casing.

By means of the construction above described, the lubricant contained in the bearings is positively prevented from being washed out, because of the shields 18 and 21 extending into the interior of the casing, and because of the cap 17 and shield 22 outside the casing. The shields 18 and 21 positively prevent the water from the buckets from being thrown into such a position, that it will enter the bearings and cause them to corrode, and the cap 17 and shield 22 will prevent any water from rain and snow, to which the pump may be subjected, from entering the bearings and also detrimentally affecting them. In addition to this, the cap 17 prevents grease contained in the bearing 10 from being washed down the side of the pump casing and thereby prevents the pump casing from becoming unsightly. Furthermore, the shield 22 affords ample protection to the operating mechanism 9 and prevents rain and snow from entering.

Having thus described my invention, what I claim is:

1. A bucket pump comprising a casing, a reel carrying shaft located in the casing, bearings adapted to mount said reel carrying shaft, mechanism adapted to rotate the shaft, each of said bearings consisting of a boss extending through the casing, and overhanging shields formed on the boss, adapted to prevent entrance of water to the bearing from the interior or exterior of the casing, said shields extending across the top and down the sides, with the bottom of the bearing exposed, the shield over the mechanism extending beyond the mechanism.

2. A bearing for the crank end of the reel carrying shaft of a bucket pump, comprising a cylindrical journal boss, a semicircular overhanging flange of a diameter substantially equal to that of the boss and projecting from the inner side thereof, and an enlarged overhanging flange projecting from the crank side of the boss and extending beyond the point of connection of the crank with a shaft.

3. In combination in a bucket pump, a casing, a bucket carrying shaft located within the casing, operating mechanism for the shaft, a bearing mounted on one side of the casing and adapted to mount one end of the shaft, said bearing comprising a journal boss, an overhanging shield formed on the journal boss and projecting within said casing, and a cap formed integrally with the journal boss and located on the exterior of the casing, and a second bearing adapted to mount the opposite end of the shaft and mounted on the opposite side of the casing, said second bearing consisting of a journal boss, an overhanging shield formed on the journal boss and extending within the casing, and a shield formed on the journal boss and extending to the exterior of the casing and beyond the operating mechanism.

In testimony whereof, I have hereunto subscribed my name this 13th day of November, 1914.

EDWARD F. HAPPENSACK.

Witnesses:
WALTER F. MURRAY,
W. THORNTON BOGERT.

Copies of this patent may be obtained for five cents each, by addressing the "Commissioner of Patents, Washington, D. C."